Feb. 3, 1942.  R. J. CLARKSON  2,271,854
CORD STRETCHING APPARATUS
Filed March 13, 1941  2 Sheets-Sheet 1

INVENTOR.
ROBERT J. CLARKSON
BY
Lester J. Budlong
ATTORNEY

Feb. 3, 1942.   R. J. CLARKSON   2,271,854
CORD STRETCHING APPARATUS
Filed March 13, 1941   2 Sheets-Sheet 2
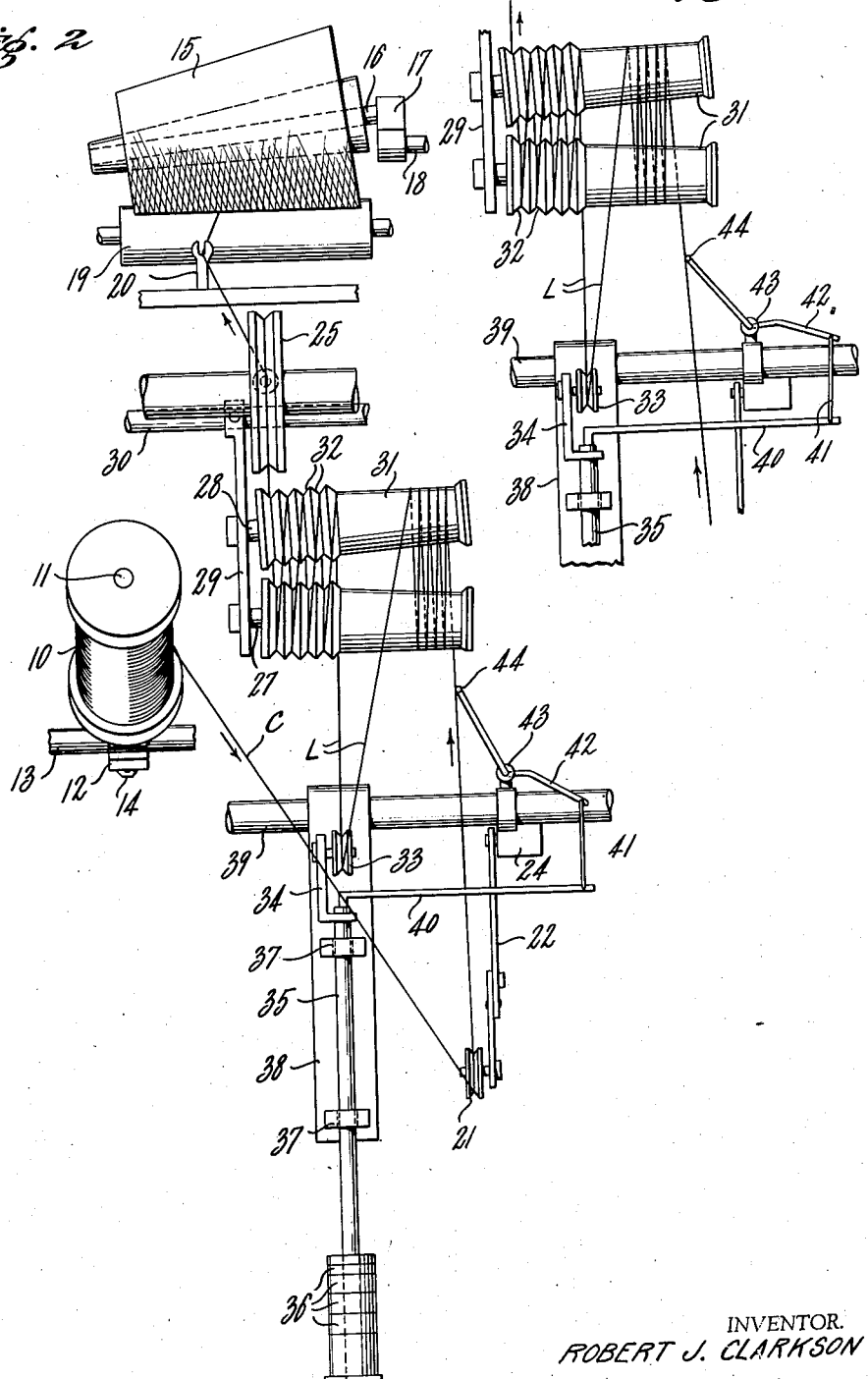
INVENTOR.
ROBERT J. CLARKSON
BY
ATTORNEY Patented Feb. 3, 1942

2,271,854

UNITED STATES PATENT OFFICE 2,271,854

CORD STRETCHING APPARATUS

Robert J. Clarkson, Hogansville, Ga., assignor to United States Rubber Company, New York, N. Y., a corporation of New Jersey Application March 13, 1941, Serial No. 383,139

7 Claims. (Cl. 28—57)

This invention relates to apparatus for imparting a permanent stretch to cord of the type that is employed to reinforce tires and fabricated belts.

It has been found that cord such for example as cotton cord used to reinforce tires and other articles of manufacture can be made more compact and otherwise improved by imparting to the cord a permanent stretch.

Various forms of cord stretching mechanism have been proposed heretofore and have been used to stretch large quantities of tire cord to thereby produce what is known as a low stretch cord. These prior cord stretching devices, however, or most of them tend to stretch or elongate the cord being treated a fixed amount, such for example as 5%, throughout the length of the cord, notwithstanding the fact that one portion of such cord may be capable of stretch more than another portion thereof.

It is found in practice that it is practically impossible to manufacture cord that is uniform in its stretched characteristics upon different spools or packages or throughout the length of the cord on a single spool. In other words in manufacturing cord it is found that such cord may be capable of stretching 10% at one point along its length and at a short distance therefrom may be capable of stretching 12%. If such a cord is subjected to a stretching operation that stretches it the same amount throughout all portions of its length, as heretofore, then the original variations in the stretching properties of the cord will be carried over in the final stretched product and may be magnified in the final product.

The present invention contemplates mechanism for overcoming this difficulty, and one important feature of the invention resides in mechanism which is adapted to subject each portion of the cord throughout its length to the same predetermined load or weight so that those portions of the cord which stretch most freely will be elongated more under this load than the portions of the cord which stretch less freely. In this way, all portions of the cord will be pulled down to a common stretch level or residue stretch, and a stretched cord will be produced which is more uniform than heretofore as to the amount of stretch which remains in the cord after such stretching operation.

In carrying out the present invention the cord stretching weight is arranged to be floatingly supported by a looped portion of the advancing cord so that the portion of the cord forming this loop will be subjected to a definite stretching weight such as 10 pounds for example. In order that the cord may floatingly support the weight in a looped portion thereof as the cord advances, it is necessary to provide mechanism for controlling the size of such loop.

Another feature of the invention therefore resides in mechanisms controlled by the movement of the weight for regulating the speed at which the cord is advanced toward said loop, to thereby increase or decrease the size of the loop as the weight moves up and down. This is accomplished by providing a pair of spaced rolls at least one of which is tapered and about which the cord is wound in a plurality of runs so that the speed at which this cord is being delivered to the weight may be increased by moving these runs towards the large end of the tapered roll, and decreased by moving these runs towards the small end of said roll. The rising and falling movement of the weight is utilized to shift these runs along the tapered roll.

The above and other features of the invention and novel combination of parts will be hereinafter described in connection with the accompanying drawings which illustrate one good practical form of the invention.

In the drawings:

Fig. 2 is a front elevation of the mechanism shown in Fig. 1; and

Fig. 3 is a front elevation of part of the mechanism shown in Fig. 2 illustrating the cord runs as shifted to a different position upon the tapered rolls.

Figure 1:
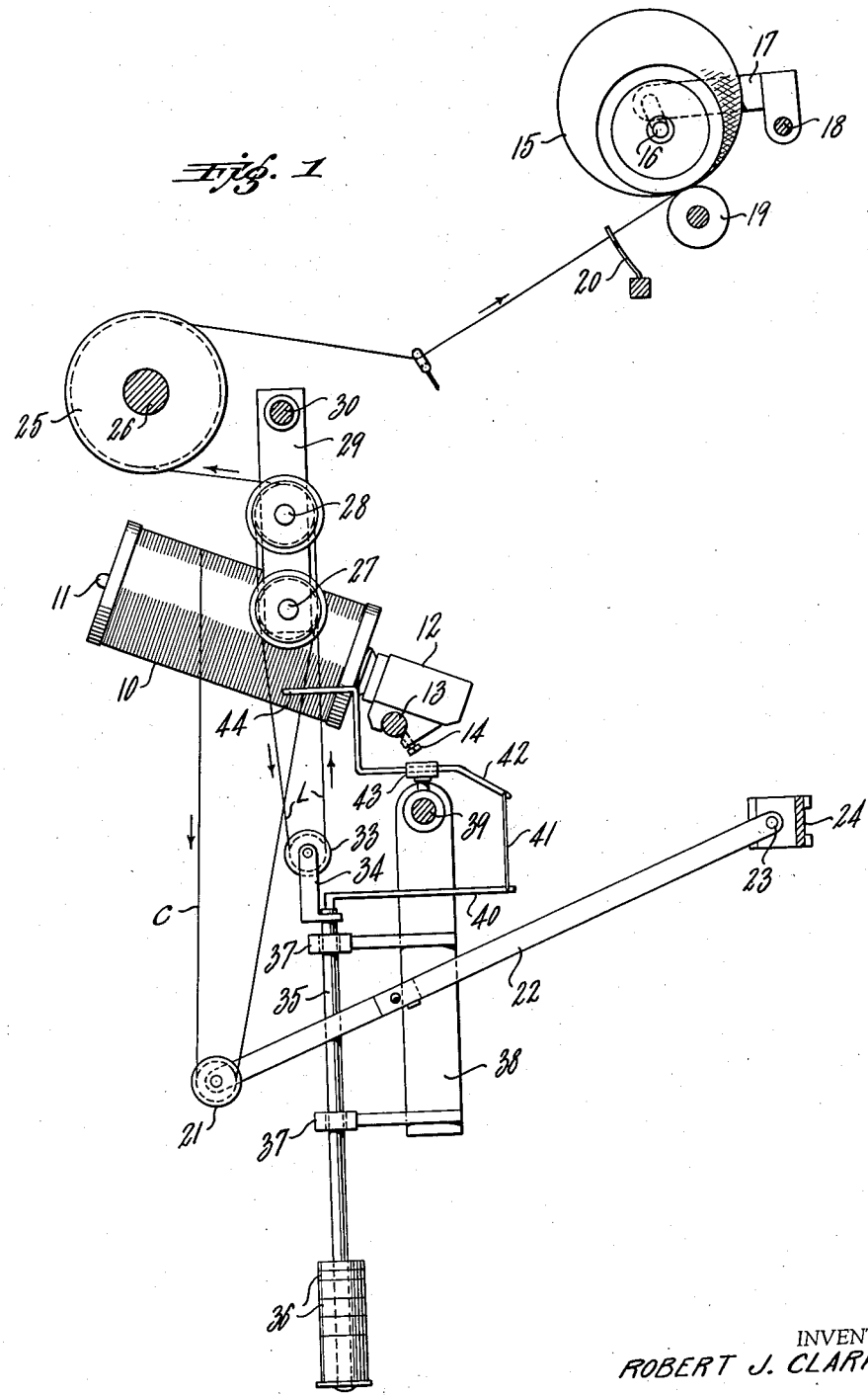
Fig. 1 is a transverse vertical section through portions of a cord winding machine equipped with the cord stretching mechanism of the present invention.

Cord stretching mechanism embodying the features of the present invention may be variously constructed and may be used upon various types of cord winding machines, but has been designed more particularly for use upon a cord winding machine of the general type illustrated in the Newton and Austin Patent No. 2,226,135, wherein the cord stretching mechanism of the present invention may be substituted in place of the cord stretching rolls 31 and 32 shown in said patent.

In the embodiment of the invention illustrated in the drawings the cord C to be stretched and wound into a large shipping package is supplied by a spool or let-off package 10 which is mounted upon an inclined spindle 11 that rotates with the package. This spindle is rotatably mounted within the casing 12 which is shown as clamped to the supporting rod 13 at the desired inclination by the bolt 14. The cord C after passing through various devices to be described is wound upon the cord take-up package or cone 15 which is rotatably mounted on a supporting spindle 16. This spindle is shown as secured at one end to a supporting arm 17 which is mounted for swinging movement about the shaft 18. The arrangement is such that the package or cone 15 irrespective of its size may rest by gravity upon the power driven drum 19 to be rotated thereby at a predetermined speed, and the cord is wound evenly upon this package by the traverse 20.

The cord C in the construction shown passes downwardly from its let-off spool 10 to a grooved roller 21 carried at the outer end of a drop arm or knock-off arm 22 which is pivotally secured at 23 to a fixed portion 24 of the machine frame. The cord extends upwardly from this roller 21 to cord stretching mechanism to be described. The arrangement is such that the arm 22 is swingingly supported by the looped portion of the cord as shown in Fig. 1 and this arm serves to some extent to tension the cord, and also to actuate stop mechanism when the cord breaks or becomes too slack as in said patent.

The cord stretching mechanism of the present invention, may as above stated be used in place of the cord stretching rolls 31 and 32 of said patent, and is designed to be operated by the advancing pull exerted upon the cord C by the take-up package 15 or by the auxiliary driving sheave 25 which is mounted upon and driven by the shaft 26 to thereby facilitate the drawing of the cord from the let-off package 10 and through the cord stretching mechanism. The cord upon leaving this sheave 25 may pass through a guide eye as shown, which may be connected to stopping mechanism as in said patent.

The mechanism so far described by numerals forms no essential part of the present invention and is more fully shown and described in the above mentioned patent. The cord stretching mechanism of the present invention which is adapted to permanently stretch the cord by subjecting all portions thereof to the same weight, as it passes from the let-off package 10 to the take-up package 15 will not be described.

The desired stretch is imparted to the cord in accordance with the present invention by suspending a cord stretching weight from a looped portion of the travelling cord, and by regulating the size of this loop automatically by varying the speed at which the cord is fed to the loop. The cord take-up mechanism shown draws the cord from the stretching mechanism at a uniform rate of speed, therefore by varying the speed at which the cord is advanced to the loop the size of such loop may be controlled so that the weight will be at all times supported by the running cord.

The mechanism for accomplishing this may be varied, and as shown includes a pair of free running rolls which are rotatably supported in spaced relation to each other by the shafts 27 and 28. These shafts are supported by a bracket 29 which is secured to a bar 30 of the machine frame. Each roll consists of a tapered portion 31 and a larger portion provided with the annular grooves 32, and these rolls are supported by the shafts 27 and 28 so that they diverge slightly from each other in a common plane as shown.

Below these free running rolls is provided the weight means consisting of a grooved pulley 33 rotatably mounted upon a bracket 34 which bracket is secured to the upper end of a sliding rod 35 that carried at its lower end the weights 36. This rod 35 is supported for vertical sliding movement by the guides 37 secured to the bracket 38 which is supported by a bar 39 of the machine frame.

The arrangement is such that the cord C in passing upwardly from the roller 21 is wound around the tapered portions 31 of the free running rolls in about five separate runs to thereby prevent the cord from slipping upon this portion of the rolls. The cord then passes downwardly around the grooved pulley 33 and then upwardly to the grooves 32 of the rolls where it is wound around these grooves in a number of spaced runs as shown. In this way a loop L is formed which floatingly supports the weights 36.

The advancing pull exerted upon the cord C by the means 15 and 25 will cause the grooved portion 32 of the free running rolls to rotate at a definite speed and thereby advance the portion of the cord L being stretched from the pulley 33 at a predetermined speed. At the same time that portion of the cord which engages the somewhat smaller tapered portions 31 of the rolls will be advanced toward the weight supporting pulley 33 at a slower speed, to thereby provide for the stretching of the loop L by the action of the weights 36. In this manner all portions of the cord are subjected successively to the stretching action of the same load or weight.

If cord with lower than the average initial stretch properties is fed to the weight, the weight will rise due to the small amount of elongation of this cord. On the other hand if cord with higher than average initial stretch is fed to the weight the latter will fall. It is important to control this rising and falling of the weight to keep it within reasonable bounds and this is accomplished in accordance with the present invention by employing the movement of the weight to shift the windings upon the tapered portion of the rolls from the smaller towards the larger diameter of these rolls to thereby speed up the delivery of the cord to the stretching point, or return the coils to the small end of these rolls to slow down delivery. The purpose in mounting the free running rolls so that their axes diverge in a common plane is to space the runs as shown so that they will not chafe each other. This spacing results from the fact that the cord windings tend to go on each roll at right angles to its axis of rotation.

In the construction shown the grooved roller 21 upon the knock-off arm 22 is so positioned that it tends to deliver the cord C to the smaller end of the tapered rolls, to thereby provide for the stretching of the cord a maximum amount. When the weight is supported by the loop L of the travelling cord as shown in Fig. 2 and the weight rises due to a reduction in the amount of stretch produced in the cord by such weight, then the coils upon the portions 31 of the rolls should be moved from the position in which they are shown in Fig. 2 toward the position in which they are shown in Fig. 3 to thereby feed more cord to the loop.

This is accomplished in the construction shown by providing the arm 40 which is rigidly secured to the upper end of the rod 35 and extends laterally therefrom, and the outer end of this arm is connected by a link 41 to an arm 42 of a rocking lever that is journalled in a supporting bracket 43. This rocking lever has an upwardly and laterally extending arm 44 positioned to engage the portion of the cord passing upwardly from the groove pulley 21 to the rolls and may be rocked to guide the cord on to the larger portion of the tapered rolls, as will be apparent from Figs. 2 and 3. When the weight moves downwardly again the cord guide arm 44 will swing away from the cord and permit the cord to return to the smaller portions of the rolls as shown in Fig. 2. When the machine is not threaded up the weight supporting bracket 34 will rest upon the upper guide 37 to support the weight.

It will be seen from the foregoing that by employing the mechanism of the present invention, the cord will be subjected to the same load or weight throughout all portions of its length, and that the size of its weight supporting loop is kept within reasonable bounds by utilizing the movement of this weight mechanism to shift the cord windings from a smaller to a larger portion of the tapered rolls. A slight amount of stretch may be imparted to the cord due to the fact that its is wound several times around the tapered portions 31 of the rolls but this is not important, since the only purpose in winding the cord several times around these rolls is to prevent slippage. The amount of weight suspended upon the cord loop L may be varied to change the final stretch or residue stretch left in the cord, or to treat different size cords.

Having thus described my invention what I claim and desire to protect by Letters Patent is:

1. In a cord stretching apparatus in combination, cord supply means, power driven cord take-up mechanism, a cord stretching weight arranged to be floatingly supported by a looped portion of the advancing cord, a pair of cooperating tapered rolls having the cord wound thereabouts in successive runs and arranged to advance the cord to said loop, and means operable by the rising of said weight to shift the cord winding towards the larger ends of said rolls to thereby advance the cord faster to the loop.

2. In a cord stretching apparatus in combination, cord supply means, power driven cord take-up mechanism, a cord stretching weight arranged to be floatingly supported by a looped portion of the advancing cord, a pair of cooperating rolls at least one of which is tapered having the cord wound thereabout in successive runs and adapted to advance the cord to said loop, and means operable by the rising movement of said weight to shift the cord windings towards the larger end of the tapered roll to thereby advance the cord faster to the loop.

3. In a cord stretching apparatus in combination, cord supply means, power driven cord take-up means, a cord stretching weight arranged to be floatingly supported by a looped portion of the advancing cord, and mechanism controlled by the weight movement to regulate the size of said loop, including a pair of free turning rolls about which the cord is wound in successive runs and having a tapered portion for advancing the cord toward said loop and a larger portion for advancing it from said loop, and means operable by the rising movement of said weight to shift the cord along the tapered roll in a direction to advance the cord faster to the loop.

4. In a cord stretching apparatus in combination, cord supply means, power driven cord take-up means, a cord stretching weight arranged to be floatingly supported by a looped portion of the advancing cord, and mechanism controlled by the weight movement to regulate the size of said loop, including a pair of free turning rolls adapted to be rotated by the advancing pull on the cord and provided with a portion about which the cord is wound in successive runs for advancing the cord from said loop and a smaller tapered portion about which the cord is wound in successive runs for advancing it towards said loop, and means operable by the rising movement of said weight to shift the cord along the tapered roll in a direction to feed it faster to the loop.

5. In a cord stretching apparatus in combination, cord supply means, power driven cord take-up mechanism, a cord stretching weight arranged to be floatingly supported by a looped portion of the advancing cord, a pair of cooperating tapered rolls supported upon converging axes and having the cord wound thereupon in spaced successive runs and adapted to advance the cord to said loop, and means operable by the movement of said weight to shift the cord windings along the tapered rolls to thereby change the rate of feed of this portion of the cord to the loop.

6. In a cord stretching apparatus in combination, cord supply means, power driven cord take-up mechanism, a cord stretching weight arranged to be floatingly supported by a looped portion of the advancing cord, means for advancing the cord towards said loop at one speed and from the loop at a higher speed including a pair of spaced rolls at least one of which is tapered and about which the cord is wound in successive runs, and means operable by the movement of said weight to shift the cord windings along said tapered roll to thereby change the rate of feed of this portion of the cord relative to the loop.

7. In a cord stretching apparatus in combination, cord let-off means, power driven cord take-up means, a cord stretching weight arranged to be floatingly supported by a looped portion of the advancing cord, and mechanism controlled by the weight movement to regulate the size of said loop, including a pair of rolls about which the cord is wound in successive runs and having a tapered portion for advancing the cord towards said loop and a larger portion for advancing the cord from said loop, and means operable by the movement of said weight to shift the cord runs along the tapered portion of the rolls to thereby change the rate of feed of this portion of the cord relative to the loop.

ROBERT J. CLARKSON.